US006631796B2

United States Patent
Yanaka et al.

(10) Patent No.: US 6,631,796 B2
(45) Date of Patent: Oct. 14, 2003

(54) VEHICLE PARKING BRAKE SYSTEM, AND METHOD OF CONTROLLING THE SAME

(75) Inventors: Akihiro Yanaka, Toyota (JP); Shoichi Shono, Nishikamo-gun (JP); Toshiaki Hamada, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/927,310

(22) Filed: Aug. 13, 2001

(65) Prior Publication Data

US 2002/0023818 A1 Feb. 28, 2002

(30) Foreign Application Priority Data

Aug. 25, 2000 (JP) ........................................ 2000-255831

(51) Int. Cl.[7] .............................................. B60K 41/20
(52) U.S. Cl. ............................... 192/219.4; 192/219.6; 477/184
(58) Field of Search ................................ 477/184, 182; 192/222, 219.4, 219.6

(56) References Cited

U.S. PATENT DOCUMENTS 4,561,527 A * 12/1985 Nakamoto et al. ....... 192/219.4
4,629,043 A * 12/1986 Matsuo et al. ........... 192/219.4
5,667,282 A * 9/1997 Kim ......................... 192/222

FOREIGN PATENT DOCUMENTS

JP    B2 3-2696    1/1991
JP    A 7-101319   4/1995

* cited by examiner

Primary Examiner—Richard M. Lorence
Assistant Examiner—Eric M. Williams
(74) Attorney, Agent, or Firm—Oliff & Berridge, PLC

(57) ABSTRACT

A vehicle parking brake system having an AUTO selector for selectively establishing an automatic mode and a manual mode, parking brake units, and an electronic control unit operable in the automatic mode to automatically activate the parking brake units to apply a parking brake to vehicle rear left and right wheels (RW1, RW2) when the vehicle is in a parked state, and to automatically de-activate the parking brake units to remove the parking brake from the vehicle wheel, and in the manual mode to selectively apply and remove the parking brake to and from the vehicle wheels according to operations of a MANUAL MODE control switch. Where the MANUAL MODE control switch is operated in the automatic mode, data indicative of the operation of the control switch is kept stored in a memory until the memory is cleared when predetermined operating state of the vehicle is detected, so that the control of the parking brake units in the automatic mode is restricted to control the parking rake units according to the operations of the MANUAL MODE control switch in the manual mode.

24 Claims, 9 Drawing Sheets

VEHICLE PARKING BRAKE SYSTEM, AND METHOD OF CONTROLLING THE SAME

INCORPORATION BY REFERENCE

The disclosure of Japanese Patent Application No. 2000-255831 filed on Aug. 25, 2000 including the specification, drawings and abstract is incorporated herein by reference in its entirety.

BACKGROUND OF THE INVENTION

1. Field of Invention

The invention relates to a parking brake system for a vehicle, such as an automotive vehicle, which is arranged to selectively apply and remove a parking brake to and from wheels of the vehicle by operating an electrically operated actuator, and more particularly to such a vehicle parking brake system having a function of automatically applying or removing the parking brake by controlling the electrically operated actuator depending upon an operating condition of the vehicle. This invention is also concerned with a method of controlling such a vehicle parking brake system.

2. Description of Related Art

An example of the vehicle parking brake system of the type described above is disclosed in JP-B2-3-2696. This vehicle parking brake system has an automatic mode in which a parking brake is automatically applied and removed to and from the vehicle, and a manual mode in which the parking brake is applied and removed by manual operations by the vehicle operator. The automatic and manual modes are selectively established. In the automatic mode, the parking brake is automatically applied to the vehicle when a predetermined condition is satisfied, for instance, when a brake pedal is in operation while the vehicle is stationary, and the parking brake application is automatically released when a predetermined condition is satisfied, for instance, when an accelerator pedal is operated while the vehicle is stationary. In the manual mode, the parking brake is selectively applied to or removed from the vehicle, in response to an manual operation of a manually operable member. The parking brake system disclosed in the publication identified above is further arranged such that the manually operable member permits application of the parking brake to the vehicle even while the vehicle is running. However, this parking brake application during the vehicle running is possible only where a service brake system (a normal braking system) becomes defective.

In the parking brake system described above, the parking brake is applied and removed to and from the vehicle by operating the manually operable member even in the automatic mode. This parking brake system is basically arranged such that the operation in the automatic mode and the operation in the manual mode are performed independently of each other, except where the service brake system is defective. That is, the manual operation in the automatic mode is effective only once for that manual operation. However after the parking brake application and release by the manual operation are canceled, the subsequent parking brake application and release are effected in the automatic mode depending upon whether the predetermined conditions indicated above are satisfied or not. In this respect, it is noted that the parking brake mechanism may freeze if the vehicle, braked by the parking brake system in the automatic mode, is parked for a long time during cold weather. To prevent this freezing, it is desired to remove the parking brake from the vehicle by operating the manually operable member, even in the automatic mode. After the manual operation of the manually operable member, however, the parking brake is again automatically applied to the vehicle in the automatic mode. To prevent this parking brake application in the automatic mode, it is necessary to first switch the operating mode of the parking brake system from the automatic mode to the manual mode, and then operate the manually operable member for removing the parking brake. When it is desired to establish the automatic mode again, the manual mode must be changed to the automatic mode, again. Thus, the known parking brake system does not permit parking brake application and removal as desired in the manual mode, while assuring ease of control of the system in the automatic mode.

If the service brake system becomes defective, the above-mentioned parking brake system can apply the parking brake by the manual operation while the vehicle is running. That is, the manual operation can be performed only when the defect of the service brake system is detected. However if the defect of the service brake system is not detected, the parking brake system can not brake the vehicle by the manual operation in a case where the operator of the vehicle can not brake the vehicle for some physical defect of the operator and so on, or a case where the operator does not desire braking the vehicle by the service brake.

SUMMARY OF THE INVENTION

The invention thus provides a parking brake system and a method of the parking brake system for an automotive vehicle or other vehicle, which permits parking brake application to the vehicle by operation of a manually operable member even in the automatic mode, even while the service brake system is not defective, or which permits desired manual control for parking brake application and removal, while assuring ease of control of the system in the automatic mode.

In a first exemplary aspect of the invention, the invention provides a parking brake system for a vehicle with a parking-brake-force control mechanism driven by an electrically operated actuator and which is operable to selectively apply and remove a parking brake force to and from a wheel of the vehicle; an automatic-mode selector, manually operable by an operator of the vehicle, to select an automatic mode in which the parking brake force is automatically applied and removed to and from the wheel; a manual-mode control member, manually operable by the operator, to selectively apply and remove the parking brake force to and from the wheel; a first vehicle-state detector that detects the first operating state of the vehicle; a second vehicle-state detector that detects the predetermined second operating state of the vehicle; and a controller that controls the parking-brake-force control mechanism in the automatic mode according to a first operating state of the vehicle to control automatic application and removal of the parking brake force detected by the first vehicle-state detector, controls the parking-brake-force control mechanism in response to an operation of the manual-mode control member to control manual application and removal of the parking brake force, and restricts an automatic control of the parking-brake-force control mechanism in the automatic mode until detection of a predetermined second operating state of the vehicle by the second vehicle-state detector.

In the parking brake system constructed according to the first exemplary aspect of this invention, the controller is arranged to restrict the automatic control of the parking-brake-force control mechanism by the controller until detection of the predetermined second operating state of the vehicle. Accordingly, the operation of the manual-mode control member substantially permits the parking-brake-force control mechanism to be controlled to selectively apply and remove the parking brake force to and from the wheel of the vehicle even while the automatic mode is selected. Thus, the present parking brake system permits desired manual control of the parking-brake-force control mechanism with the manual-mode control member, while assuring ease of control of the mechanism in the automatic mode.

The parking brake system constructed according to the principle of the invention is applicable to various types of vehicles including not only automotive vehicles driven by an engine and/or an electric motor, but also vehicles not equipped with a drive power source.

In a second exemplary aspect of the invention, the invention provides A method of controlling a parking brake system for a vehicle, the parking brake system comprising: (a) a parking-brake-force control mechanism driven by an electrically operated actuator and which is operable to selectively apply and remove a parking brake force to and from a wheel of the vehicle; (b) an automatic-mode selector, manually operable by an operator of the vehicle, to select an automatic mode in which the parking brake force is automatically applied and removed to and from the wheel; (c) a manual-mode control member, manually operable by the operator, to selectively apply and remove the parking brake force to and from the wheel; and (d) a controller that controls the parking-brake-force control mechanism according to a first operating state of the vehicle to control automatic application and removal of the parking brake force, and controls the parking-brake-force control mechanism, to control manual application and removal of the parking brake force, the method comprises the steps of: detecting operation of the manual-mode control member; removing the operation of the manual-mode control upon detection of a predetermined second operating state of the vehicle; and restricting an automatic control of the parking-brake-force control mechanism while the manual-mode control member is operated.

According to the method of the invention described above, the automatic control of the parking-brake-force control mechanism by the controller is restricted while the manual-mode control member is operated. Accordingly, the operation of the manual-mode control member substantially permits the parking-brake-force control mechanism to be controlled to selectively apply and remove the parking brake force to and from the wheel of the vehicle even while the automatic mode is selected. Thus, the present parking brake system permits desired manual control of the parking-brake-force control mechanism with the manual-mode control member, while assuring ease of control of the mechanism in the automatic mode.

In a third exemplary aspect of the invention, the invention provides a parking brake system for a vehicle with a parking-brake-force control mechanism driven by an electrically operated actuator and which is operable to selectively apply and remove a parking brake force to and from a wheel of the vehicle; a manual-mode control member, manually operable by the operator, to effect at least one of application and removal of the parking brake force to and from the wheel; and a controller that controls the parking-brake-force control mechanism according to an operating state of the vehicle to control automatic application and removal of the parking brake force, to control the parking-brake-force control mechanism in response to an operation of the manual-mode control member to control the at least one of application and removal of the parking brake force to and from the wheel, and control restricts an automatic control of the parking-brake-force control mechanism during the operation of the manual-mode control member.

The parking brake system constructed according to the third exemplary aspect of this invention is simplified in construction owing to the elimination of a manually operable automatic-mode selector as provided in the parking brake system constructed according to the first aspect of the invention.

In a fourth exemplary aspect of the invention, the invention provides a method of controlling a parking brake system for a vehicle, the parking brake system comprises: (a) a parking-brake-force control mechanism driven by an electrically operated actuator and which is operable to selectively apply and remove a parking brake force to and from a wheel of the vehicle; (b) a manual-mode control member, manually operable by the operator, to effect at least one of application and removal of the parking brake force to and from the wheel; and (c) a controller that controls the parking-brake-force control mechanism according to an operating state of the vehicle to control automatic application and removal of the parking brake force, and to control the parking-brake-force control mechanism in response to an operation of the manual-mode control member to control the at least one of application and removal of the parking brake force to and from the wheel, the method comprising the steps of: detecting an operation of the manual-mode control; and restricting an automatic control of the parking-brake-force control mechanism by the controller during the operation of the manual-mode control member.

BRIEF DESCRIPTION OF THE DRAWINGS

The above and other objects, features, advantages, and technical and industrial significance of this invention will be better understood by reading the following detailed description of presently preferred exemplary embodiments of the invention, when considered in connection with the accompanying drawings, in which.

DETAILED DESCRIPTION OF THE PREFERRED EMBODIMENTS

Figure 1:
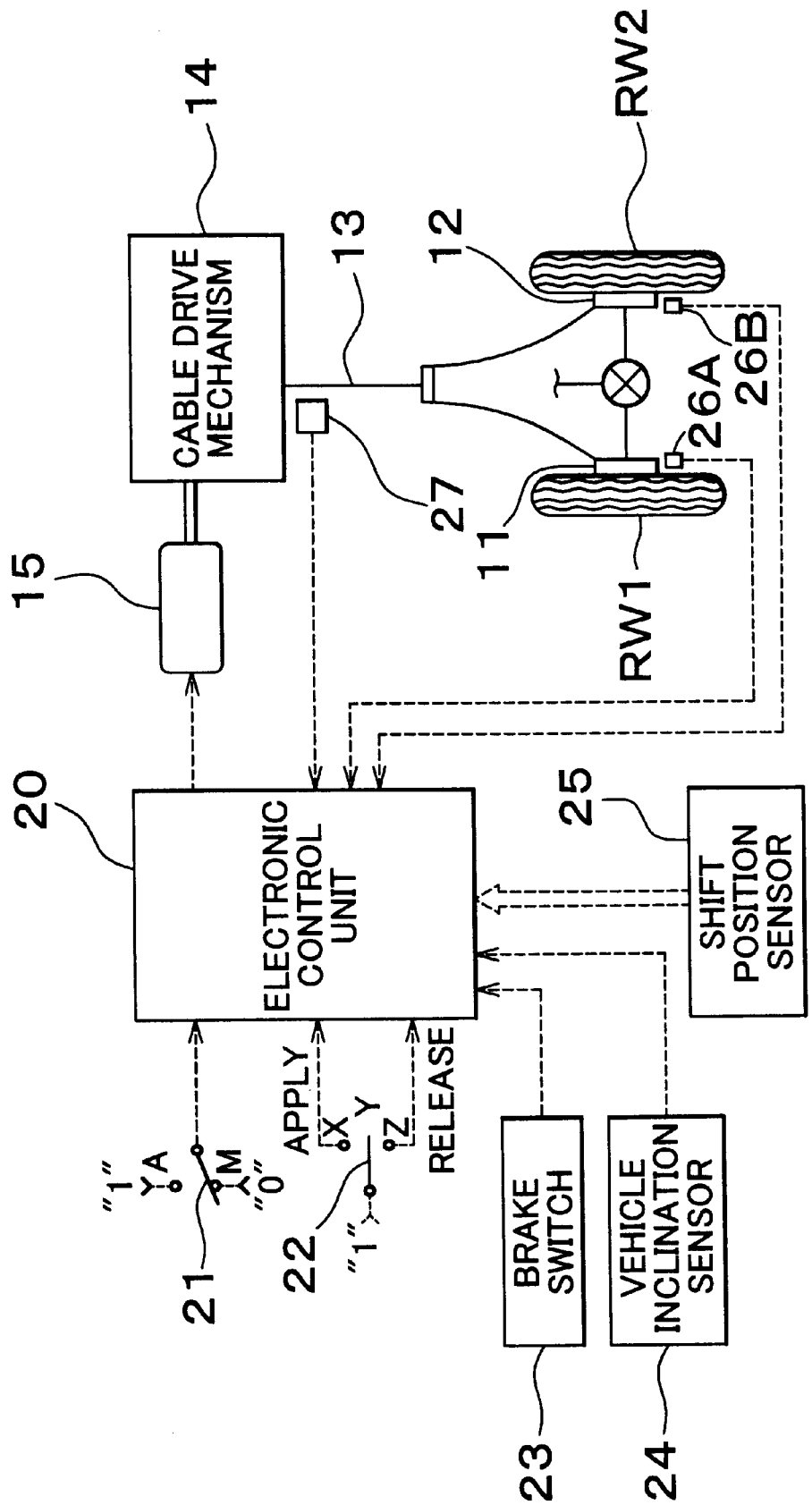
FIG. 1 is a schematic view showing a general arrangement of a parking brake system of an automotive vehicle, which system is constructed according to a first embodiment of this invention.

Referring first to the schematic view of FIG. 1, there is schematically shown the general arrangement of a parking brake system for an automotive vehicle, which is constructed according to a first embodiment of this invention.

The parking brake system includes two parking brake units 11, 12 disposed on the vehicle, to apply a parking brake to respective rear left and right wheels RW1, RW2. The parking brake units 11, 12 are activated to apply a parking brake force to the rear wheels RW1, RW2 when a parking brake cable 13 is pulled by a cable drive mechanism 14, and are de-activated to remove the parking brake force when the parking brake cable 13 is released or returned. It will be understood that the parking brake units 11, 12 and the cable drive mechanism 14 cooperate with each other to constitute a braking-force control mechanism for applying and removing the parking brake force to and from the rear wheels RW1, RW2. The cable drive mechanism 14 is operated by an electrically operated actuator in the form of an electric motor 15. When the electric motor 15 is held off, the cable drive mechanism 14 is held in its position that is established when the electric motor 15 is turned off. The electric motor 15 is controlled by an electronic control unit 20, such that the parking brake cable 13 is pulled and released by the cable drive mechanism 14 when the electric motor 15 is operated in the forward and reverse directions, respectively.

The electronic control unit 20 is constituted principally by a microcomputer incorporating a central processing unit (CPU), a read-only memory (ROM) and a random-access memory (RAM). The electronic control unit 20 is arranged to repeatedly execute a control program illustrated in the flow chart of FIG. 2, with a predetermined cycle time, for controlling the operation of the electric motor 15. To the electronic control unit 20, there are connected an AUTO MODE selector 21 and a MANUAL MODE control switch 22, which are manually operable members operable by the operator of the automotive vehicle.

The AUTO MODE selector 21 is a self-held type two-position switch which is disposed adjacent to the vehicle operator's seat, for operation by the vehicle operator. This AUTO MODE selector 21 has a MANUAL MODE position M and an AUTO MODE position A in which a MANUAL MODE signal and an AUTO MODE signal for selecting respective MANUAL and AUTO modes are applied to the electronic control unit 20. In the MANUAL mode, the parking brake force is manually applied and removed to and from the rear left and right wheels RW1, RW2, depending upon the presently selected operating position of the MANUAL MODE control switch 22, in principle. In the AUTO mode, the parking brake force is automatically applied and removed to and from the rear left and right wheels RW1, RW2, depending upon the operating condition of the vehicle, in principle.

The MANUAL MODE control switch 22 is a self-hold type three-position switch also disposed adjacent to the operator's seat, for operation by the operator. This MANUAL MODE control switch 22 has a first position X established when it is not in operation, a second position Y (indicated as "APPLY" in FIG. 1) selected by the operator, and a third position Z (indicated as "RELEASE" in FIG. 1) also selected by the operator. In the first position X, no signal is applied to the electronic control unit 20. In the second position Y, a parking-brake application signal for applying a parking brake to the rear wheels RW1, RW2 is applied to the control unit 20. In the third position Z, a parking-brake release signal for removing the parking brake from the rear wheels RW1, RW2 is applied to the control unit 20.

The AUTO MODE and MANUAL MODE selectors 21, 22 are preferably disposed on an instrument panel, a steering wheel shaft or a shift lever of the vehicle, or adjacent to such member, for easy manipulation of the selectors 21, 22 by the vehicle operator. One or both of the selectors 21, 22 may be operated by the foot of the vehicle operator.

To the electronic control unit 20, there are further connected a brake switch 23, a vehicle inclination sensor 24, a shift position sensor 25, wheel speed sensors 26A, 26B, and a cable tension sensor 27.

The brake switch 23 is provided to detect an operation of a foot pedal (service brake pedal) for service brakes (ordinary brakes) for the front and rear wheels. The brake switch 23 is off when the service brake pedal is in the non-operated position, and is turned on when the service brake pedal is operated or depressed. The vehicle inclination sensor 24 is provided to detect an angle of inclination of the vehicle (or the road surface on which the vehicle lies) with respect to the horizontal plane. The output signal of the sensor 24 represents the detected inclination angle of the vehicle. The shift position sensor 25 is provided to detect a presently selected one of the operating positions (PARKING position, DRIVE position, LOW position, SECOND position, REVERSE position, etc.) of a shift lever provided for a transmission of the vehicle. The output signal of the shift position sensor 25 represents the presently selected operating position of the shift lever. The wheel speed sensors 26A, 26B are provided to detect the rotating speeds of the rear left and right wheels RW1, RW2, respectively. The output signals of the wheel speed sensors 26A, 26B represent the detected speeds of the rear wheels RW1, RW2. The cable tension sensor 13 is provided to detect a tension of the parking brake cable 27. The output signal of the cable tension sensor 13 represents the detected tension of the cable 27.

There will be described an operation of the parking brake system of the present embodiment constructed as described above. When an ignition switch (not shown) provided on the vehicle is turned on, the electronic control unit 20 repeatedly executes the control program illustrated in the flow chart of FIG. 2, to selectively apply or remove the parking brake to and from the rear left and right wheels RW1, RW2. The control program is initiated with step 100, which is followed by step 102 to determine whether the vehicle operator has selected the AUTO mode, namely, whether the AUTO MODE selector 21 is placed in its AUTO MODE position A for selecting the AUTO mode.

When the AUTO MODE selector 21 is not placed in the AUTO MODE position A, that is, when the MANUAL mode is selected with the AUTO MODE selector 21 placed in the MANUAL MODE position M, a negative decision (NO) is obtained in step 102. In this case, the control flow goes to step 108 and the subsequent steps, while skipping steps 104 and 106. When the MANUAL MODE control switch 22 is not in operation, that is, when the control switch 22 is placed in the first position Y, a negative decision (NO) is obtained in steps 108 and 116. In this case, the parking brake units 11, 12 are held off, and no parking brake is applied to the rear wheels RW1, RW2.

When the MANUAL MODE control switch 22 is operated to the second position Y, to apply a parking brake to the vehicle while the vehicle is stationary, the parking-brake application signal is fed from the control switch 22 to the electronic control unit 20, so that an affirmative decision (YES) is obtained in step 108, and the control flow goes to step 110 to determine whether a STATE flag STF is set at "0". When this STATE flag STF is set at "1", it indicates that the parking brake units 11, 12 are placed in the operated or activated state so that the parking brake force is applied to the rear left and right wheels RW1, RW2. When the STATE flag STF is set at "0", it indicates that the parking brake units 11, 12 are placed in the non-operated or de-activated state so that no parking brake force is applied to the rear wheels RW1, RW2. Where the STATE flag STF is set at "0" indicating that no parking brake is applied to the rear wheels RW1, RW2, an affirmative decision (YES) is obtained in step 110, and the control flow goes to step 112 to effect a parking-brake application control in which the parking brake units 11, 12 are activated to apply the parking brake to the rear wheels RW1, RW2.

In the parking-brake application control in step 112, the electronic control unit 20 applies a forward drive signal to the electric motor 15 for operating the electric motor 15 in the forward direction. At the same time, the electronic control unit 20 receives an output signal from the cable tension sensor 27, and stops applying the forward drive signal to the electric motor 15 when the tension of the parking brake cable 13 represented by the output signal of the sensor 26 has increased to a first predetermined value. Thus, the forward operation of the electric motor 15 is initiated upon reception of the forward drive signal from the control unit 20, so that the cable drive mechanism 14 is operated by the electric motor 15, to pull the parking brake cable 13. As a result, the parking brake units 11, 12 are activated to initiate the application of a parking brake force to the rear wheels RW1, RW2. When the detected tension of the parking brake cable 13 has increased to the first predetermined value, the electronic control unit 20 stops applying the forward drive signal to the electric motor 15, so that the forward operation of the electric motor 15 is terminated so that the operation of the cable drive mechanism 14 to further pull the parking brake cable 13 is terminated. Even after the forward operation of the electric motor 15 is terminated, the cable drive mechanism 14 maintains its operating position so that the predetermined parking brake force corresponding to the first predetermined value of the tension of the cable 13 can be kept applied to the rear wheels RW1, RW2, whereby the vehicle is kept braked by the parking brake units 11, 12.

Step 112 for effecting the parking brake application control is followed by step 114 to set the STATE flag STF and a LOCK flag LKF to "1", and reset a RELEASE flag RLF to "0". The LOCK flag LKF set at "1" functions to provide stored data indicating that the MANUAL MODE control switch 22 is operated to the second position Y for applying the parking brake to the rear wheels RW1, RW2. The RELEASE flag RLF is set at "0" functions to clear stored data indicating that the MANUAL MODE control switch 22 is operated to the third position Z for releasing the parking brake.

Where the MANUAL MODE control switch 22 is operated to the third position Z while the parking brake units 11, 12 are in the operated state to apply the parking brake to the rear wheels RW1, RW2, the parking-brake release signal is fed from the control switch 22 to the electronic control unit 20. As a result, an affirmative decision (YES) is obtained in step 116, and the control flow goes to step 118 to determine whether the STATE flag STF is set at "1". Since the STATE flag STF is now set at "1", an affirmative decision (YES) is obtained in step 118, and the control flow goes to step 120 to effect a parking-brake release control.

In the parking-brake release control in step 120, the electronic control unit 20 applies a reverse drive signal to the electric motor 15 for operating the electric motor 15 in the reverse direction. At the same time, the electronic control unit 20 receives the output signal from the cable tension sensor 27, and stops applying the reverse drive signal to the electric motor 15 when the tension of the parking brake cable 13 represented by the output signal of the sensor 26 has been reduced to a second predetermined value (smaller than the first predetermined value). Thus, the reverse operation of the electric motor 15 is initiated upon reception of the reverse drive signal from the control unit 20, so that the cable drive mechanism 14 is operated by the electric motor 15, to release the parking brake cable 13. As a result, the parking brake units 11, 12 are de-activated to initiate the removal of a parking brake force from the rear wheels RW1, RW2. When the detected tension of the parking brake cable 13 has decreased to the second predetermined value, the electronic control unit 20 stops applying the reverse drive signal to the electric motor 15, so that the reverse operation of the electric motor 15 is terminated so that the operation of the cable drive mechanism 14 to further release the parking brake cable 13 is terminated. Even after the reverse operation of the electric motor 15 is terminated, the cable drive mechanism 14 maintains its operating position so that the parking brake force is kept removed from the rear wheels RW1, RW2, whereby the vehicle can be moved with the parking brake units 11, 12 held in their de-activated state.

Step 120 for effecting the parking brake release control is followed by step 122 to reset the STATE flag STF and the LKF flag LKF to "0", and set the RELEASE flag RLF to "1". The RELEASE flag RLF set at "1" functions to provide stored data indicating that the MANUAL MODE control switch 22 is operated to the third position Z for releasing the parking brake. The LOCK flag LKF set at "0" functions to clear the stored data indicating that that the MANUAL MODE control switch 22 is operated to the second position X. It is noted that these RELEASE and LOCK flags RLF, LKF are reset to "0" in the subsequent operations in steps 124–132, which will be described in detail.

While the MANUAL mode is selected by the AUTO MODE selector 21, the parking brake is selectively applied and removed to and from the rear left and right wheels RW1, RW2, by operating the MANUAL MODE control switch 22 to the second and third positions Y, Z, respectively.

There will next be described an operation of the parking brake system when the AUTO mode is selected with the MODE selector 21 placed in the AUTO MODE position A. In this case, an affirmative decision (YES) is obtained in step 102, and the control flow goes to step 104 for executing an automatic-parking-brake activation control routine, and step 106 for executing an automatic-parking-brake de-activation control routine.

Figure 3:
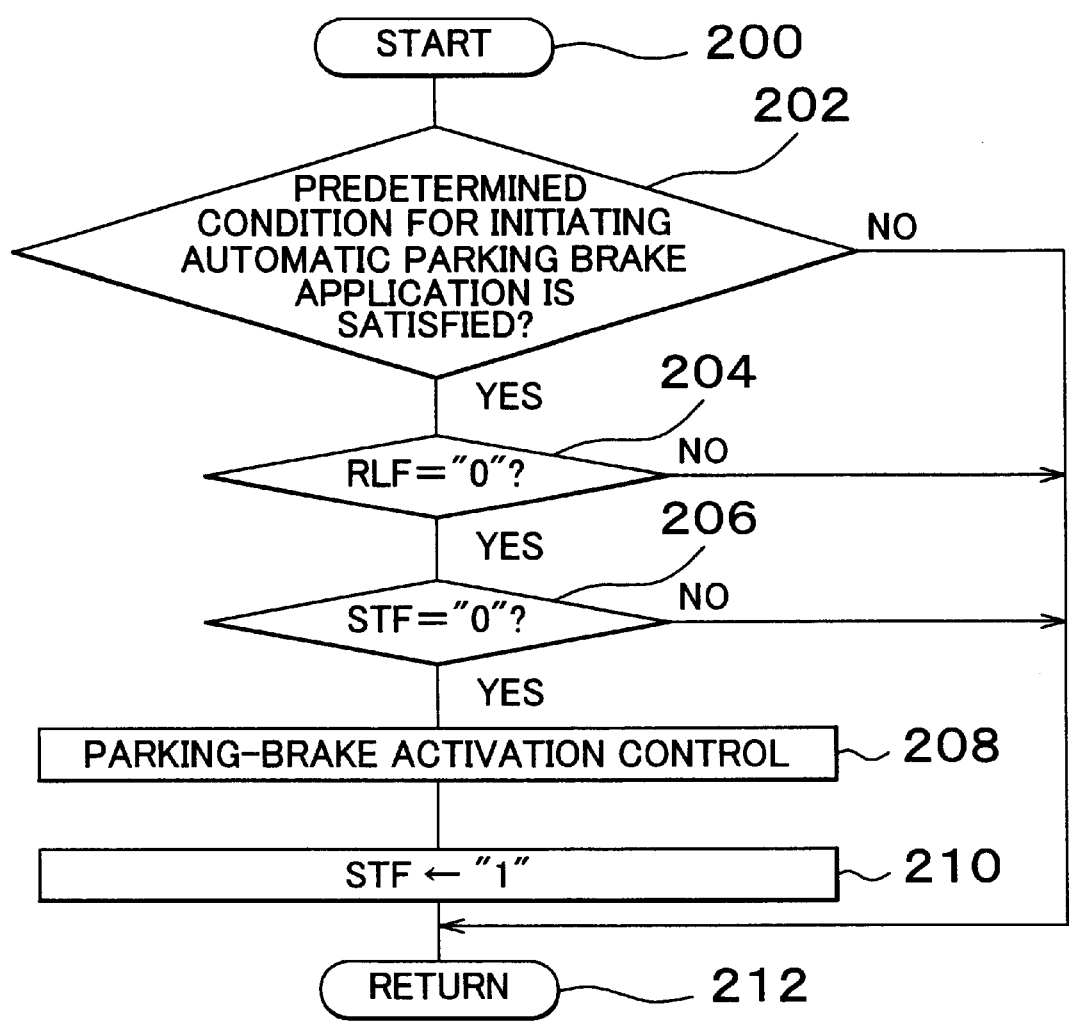
FIG. 3 is a flow chart showing details of an automatic-parking-brake activation control routine in the control program of FIG. 2.

The automatic-parking-brake activation control routine is illustrated in detail in the flow chart of FIG. 3. This control routine is initiated with step 200, which is followed by step 202 to determine whether a predetermined condition for initiating automatic parking brake application is satisfied. Basically, this condition is satisfied when the vehicle is in a parked state. A determination as to whether the vehicle is in the parked state can be made, for example, by determining whether the shift lever is placed in the PARKING position, or whether the vehicle is stopped on a slope. In the former case, the determination is effected depending upon whether the output signal of the shift position sensor 25 indicates that the shift lever is placed in the PARKING position. In the latter case, the determination is effected depending upon whether the angle of inclination of the vehicle represented by the output of the vehicle inclination sensor 24 is larger than a predetermined threshold while the rotating speeds of the rear wheels RW1, RW2 represented by the output signals of the wheel speed sensors 26A, 26B are equal or almost equal to zero. If the predetermined condition for initiating the automatic parking brake application is not satisfied, a negative decision (NO) is obtained in step 202, and the control flow goes to step 212 to terminate one cycle of execution of the present automatic-parking-brake activation control routine.

If the predetermined condition for initiating the automatic parking brake application is satisfied, an affirmative decision (YES) is obtained in step 202, and the control flow goes to step 204 to determine whether the RELEASE flag RLF is set at "0". As described above, the RELEASE flag RLF is set to "1" when the MANUAL MODE control switch 22 is operated to the third position Z for releasing the parking brake application. An operation when the control switch 22 is not placed in the third position Z, that is, when the RELEASE flag RLF is set at "0", is first described before an operation when this flag RLF is set at "1" will be described later in detail. When the flag RLF is set at "0", an affirmative decision (YES) is obtained in step 204, and the control flow goes to step 206 to determine whether the STATE flag STF is set at "0". If the STATE flag STF is set at "1" and the parking brake is applied to the rear wheels RW1, RW2, a negative decision (NO) is obtained in step 206, and the control flow goes to step 212 to terminate the present cycle of execution of the present automatic-parking-brake activation control routine.

When the STATE flag STF is set at "0", that is, when the parking brake has not been applied to the rear wheels RW1, RW2, an affirmative decision (YES) is obtained in step 206, the control flow goes to step 208 to effect a control similar to the parking-brake application control in step 112, so that the parking brake units 11, 12 are automatically activated to apply a suitable parking brake force to the rear wheels RW1, RW2. Step 208 is followed by step 210 to set the STATE flag STF to "1", and the present cycle of execution of the automatic-parking brake activation control routine is terminated in step 212.

In the AUTO mode selected by the AUTO MODE selector 21, therefore, the parking brake is automatically applied to the rear wheels RW1, RW2 when the vehicle is brought to a stop and when the shift lever is placed into the PARKING position, or when the vehicle is stopped on a slope. This arrangement advantageously eliminates the vehicle operator's need of performing a manual operation to activate the parking brake units 11, 12.

Figure 4:
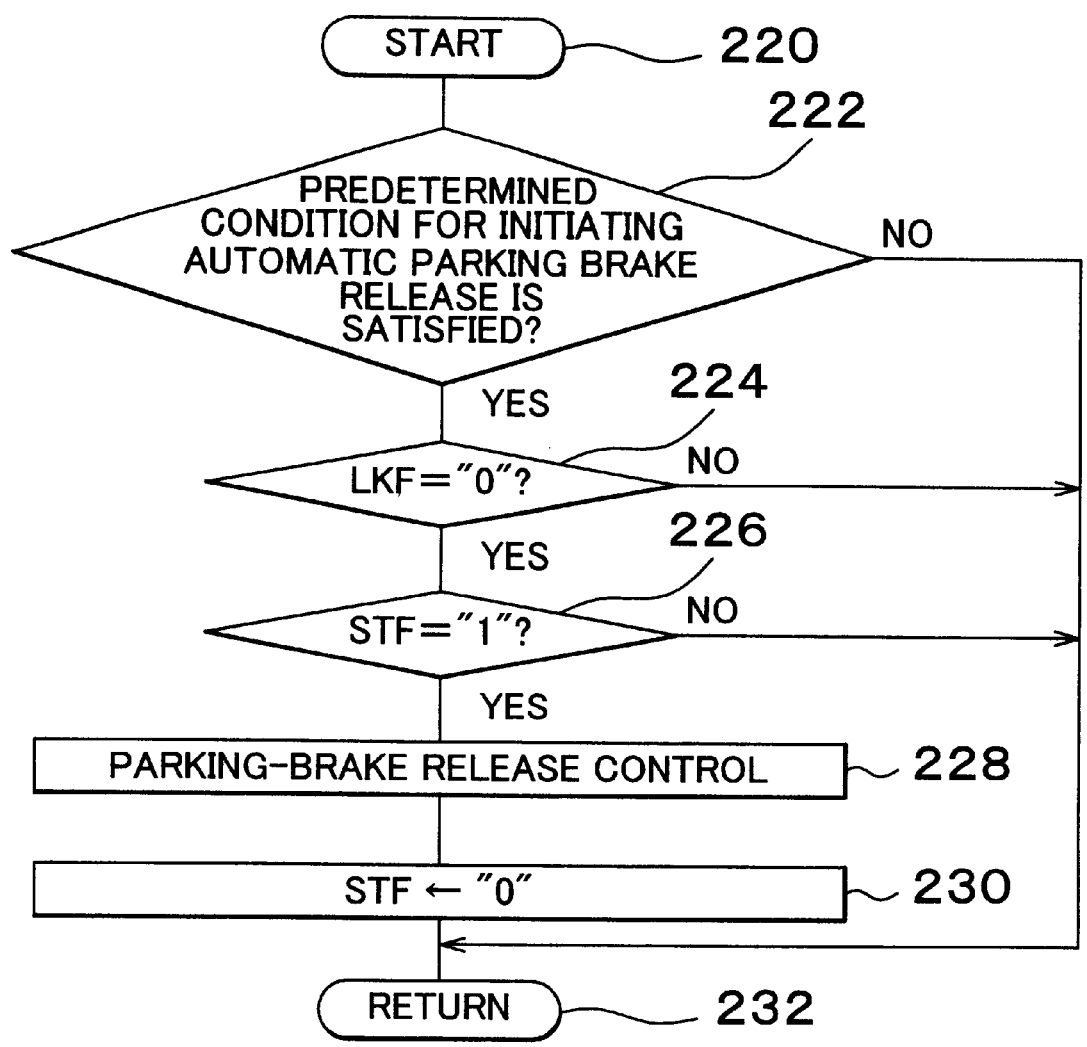
FIG. 4 is a flow chart showing details of an automatic-parking-brake de-activation control routine in the control program of FIG. 2.

Referring next to the flow chart of FIG. 4, there is shown in detail the automatic-parking-brake de-activation control routine, which is initiated with step 220. Step 220 is followed by step 222 to determine whether a predetermined condition for initiating automatic parking brake release is satisfied. Basically, this condition is satisfied when the vehicle is ready for starting. A determination as to whether the vehicle is ready for starting can be made, for example, by determining whether the shift lever is placed in any one of the forward or reverse drive positions (DRIVE position, LOW position, SECOND position or REVERSE position) while the service brake pedal is in the non-operated position. This determination is based on the output signals of the shift position sensor 25 and the brake switch 23 detecting an operation to start the vehicle. Accordingly, the operation to start the vehicle is completed when both the shift position sensor 25 and the brake switch 23 have detected that the shift lever has been placed in any one of the forward or reverse drive positions and the service brake pedal is in the non-operated position. Another determination as to whether the vehicle is ready for starting can be made when the starting of the vehicle has been detected. The starting of the vehicle is detected when the vehicle speed has exceeded a predetermined threshold speed. If the predetermined condition for initiating the automatic parking brake release is not satisfied, a negative decision (NO) is obtained in step 222, and the control flow goes to step 232 to terminate one cycle of execution of the present automatic-parking-brake de-activation control routine.

If the predetermined condition for initiating the automatic parking brake release is satisfied, an affirmative decision (YES) is obtained in step 222, and the control flow goes to step 224 to determine whether the LOCK flag LKF is set at "0". As described above, the LOCK flag LKF is set to "1" when the MANUAL MODE control switch 22 is operated to the second position Y for effecting the parking brake application. An operation when the MANUAL MODE control switch 22 is not placed in the second position Y, that is, when the LOCK flag LKF is set at "0", is first described before an operation when this flag LKF is set at "1" will be described later in detail. When the flag LKF is set at "0", an affirmative decision (YES) is obtained in step 224, and the control flow goes to step 226 to determine whether the STATE flag STF is set at "1". If the STATE flag STF is set at "0" and the parking brake is not applied to the rear wheels RW1, RW2, a negative decision (NO) is obtained in step 226, and the control flow goes to step 232 to terminate the present cycle of execution of the present automatic-parking-brake de-activation control routine.

When the STATE flag STF is set at "1", that is, when the parking brake has been applied to the rear wheels RW1, RW2, an affirmative decision (YES) is obtained in step 226, the control flow goes to step 228 to effect a control similar to the parking-brake release control in step 120, so that the parking brake units 11, 12 are automatically de-activated to remove the parking brake from the rear wheels RW1, RW2. Step 228 is followed by step 230 to set the STATE flag STF to "0", and the present cycle of execution of the automatic-parking brake activation control routine is terminated in step 232.

In the AUTO mode selected by the AUTO MODE selector 21, therefore, the parking brake application to the rear wheels RW1, RW2 is automatically released when the vehicle is ready for starting with the shift lever placed in any vehicle drive position and with the service brake pedal placed in the non-operated position. This arrangement advantageously eliminates the vehicle operator's need of performing a manual operation to de-activate the parking brake units 11, 12.

Then, the operations when the MANUAL MODE control switch 22 is operated to the second and third positions Y, Z will be described. First, there will be described the operation of the electronic control unit 20 to be performed when the MANUAL MODE control switch 22 is operated to the third position Z to release the parking brake which has been automatically applied to the rear wheels RW1, RW2 in the automatic-parking-brake activation control in step 104 (automatic-parking-brake activation control routine of FIG. 3) while the vehicle is in a parked state. In this case, the parking-brake release signal is fed from the MANUAL MODE control switch 22 to the electronic control unit 20. In response to this parking-brake release signal, the control unit 20 obtains an affirmative decision (YES) in step 116, so that steps 118–122 are implemented as described above. That is, when the parking brake is applied to the rear wheels RW1, RW2 by the parking brake units 11, 12 with the STATE flag STF set at "1", the parking-brake release control is effected in step 120 so that the parking brake is removed from the rear wheels RW1, RW2. Then, step 122 is implemented to reset the STATE and LOCK flags STF, LKF to "0", and set the RELEASE flag RLF to "1". The RELEASE flag RLF, set at "1", functions to provide stored data indicating the parking brake has been released.

Figure 2:
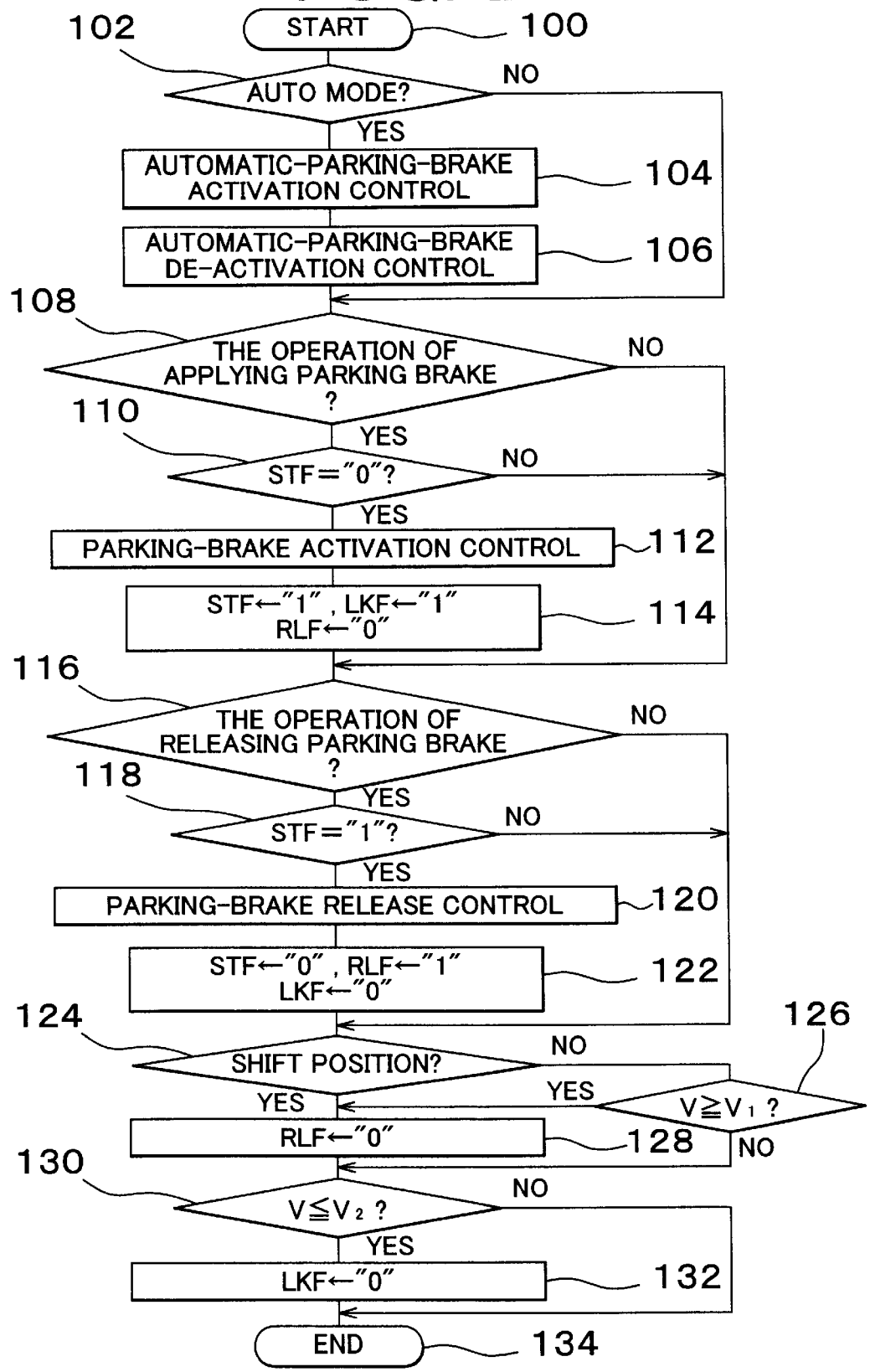
FIG. 2 is a flow chart illustrating a control program executed by an electronic control unit in the first embodiment.

When the automatic-parking-brake activation control routine of FIG. 2 is executed in step 104 while the RELEASE flag RLF is set at "1", as described above, a negative decision (NO) is obtained in step 204, and the control flow goes to step 212 to terminate one cycle of execution of the automatic-parking-brake activation control routine, while skipping steps 206–210. Thus, once the parking brake applied to the rear wheels RW1, RW2 by the parking brake units 11, 12 is released by operating the MANUAL MODE control switch 22 to the third position Z in the AUTO mode, the parking brake is not automatically applied to the rear wheels RW1, RW2 even when the predetermined condition for initiating the automatic parking brake application is subsequently satisfied, that is, even when the affirmative decision (YES) is obtained in step 202.

As described above, the vehicle operator's operation of the MANUAL MODE control switch 22 to its third position Z causes the parking brake units 11, 12 to be de-activated to remove the parking brake from the rear wheels RW1, RW2 in the AUTO mode before parking the vehicle for a long time during cold weather, making it possible to prevent freezing of the parking brake units 11, 12, parking brake cable 13 and cable drive mechanism 14, which freezing would occur if the parking brake were kept applied to the rear wheels RW1, RW2 for a long time during cold weather.

Next, there will be described the operation of the electronic control unit 20 to be performed when the shift lever is operated to any one of the vehicle drive positions (DRIVE, LOW, SECOND and REVERSE positions) to start the vehicle which has been parked, and the operation to be performed when the vehicle has just started to run. In this case, the control unit 20 obtains an affirmative decision (YES) in step 124, in response to the output signal of the shift position sensor 25, which indicates that the shift lever has been operated to any vehicle drive position. Alternatively, the control unit 20 obtains an affirmative decision (YES) in step 126, in response to the output signals of the wheel speed sensors 26A, 26B, which indicate that the vehicle speed V (calculated from the wheel speeds) has exceeded a predetermined threshold V1. As a result, step 128 is implemented to reset the RELEASE flag RLF to "0". The predetermined threshold V1 is a value above which the vehicle which has been parked is considered to have started. For instance, the threshold V1 is determined to be considerably close to zero, for example, 5 km/h. While two steps 124 and 126 are provided, either one of these two steps may be omitted.

After the RELEASE flag RLF is reset to "0", the affirmative decision (YES) is obtained in step 204 of the automatic-parking-brake activation control routine, so that steps 206–210 are implemented. As a result, the inhibition of the automatic parking brake application by the MANUAL MODE control switch 22 placed in the third position Z is cancelled, so that the automatic parking brake application to the rear wheels RW1, RW2 by the parking brake units 11, 12 can be effected when the predetermined condition for initiating the automatic parking brake application is satisfied. This arrangement does not require the vehicle operator to perform any manipulation for canceling the inhibition of the automatic parking brake application by the MANUAL MODE control switch 22 placed in the third position Z in the AUTO mode, so that the ease of control of the parking brake system in the AUTO mode is accordingly increased.

There will next be described an operation of the electronic control unit 20 to be performed when the MANUAL MODE control switch 22 is operated to the second position Y during running of the vehicle after the automatic parking brake applied to the rear wheels RW1, RW2 is automatically released in step 106. In this case, the parking-brake application signal is fed from the MANUAL MODE control switch 22 to the control unit 20. In response to this signal, the control unit obtains an affirmative decision (YES) in step 108, so that the steps 110–114 discussed above are implemented. As a result, the step 112 is implemented to activate the parking brake units 11, 12 for applying the parking brake to the rear wheels RW1, RW2, if the parking brake units 11, 12 have not been activated to apply the parking brake to the rear wheels RW1, RW2, that is, if the STATE flag STF is set at "0". Then, the step 114 is implemented to set the STATE and LOCK flags STF, LKF to "1", and reset the RELEASE flag RLF to "0". The LOCK flag LKF set at "1" functions to provide stored data indicating that the parking brake is applied to the rear wheels RW1, RW2. If the vehicle is running at a speed higher than a predetermined threshold value V2, that is, if a negative decision (NO) is obtained in step 130, and step 132 is not implemented, so that the LOCK flag LKF is held at "1". These steps 130, 132 will be described later.

When the vehicle speed V is higher than the threshold V2, the automatic-parking-brake de-activation control routine is executed in step 106, with the LOCK flag LKF held at "1", as described above. In this de-activation control routine, a negative decision (NO) is obtained in step 224, and the present cycle of execution of the de-activation control routine is terminated in step 232, with steps 226–230 being skipped. Thus, When the MANUAL MODE control switch 22 is operated by the vehicle operator to the second position Y to activate the parking brake units 11, 12 for applying the parking brake to the rear wheels RW1, RW1 in the AUTO mode, the automatic releasing of the parking brake application to the rear wheels RW1, RW2 is inhibited even when the predetermined condition for initiating the automatic parking brake release is satisfied, namely, even when the affirmative decision (YES) is obtained in step 222.

As described above, the running vehicle can be braked by the parking brake units 11, 12 (rather than the service brakes) even in the AUTO mode, by operating the MANUAL MODE control switch to the second position Y, where a manually operable member for activating the service brakes cannot be operated by the vehicle operator for some physical defect of the operator, or where the operator desires to brake the vehicle with the parking brake system.

Then, there will be described the operation of the control unit 20 to be performed when the vehicle has been brought to a stop. In this case, the control unit 20 obtains an affirmative decision (YES) in step 130, on the basis of the output signals of the wheel speed sensors 26A, 26B, which indicate that the vehicle speed V (calculated from the wheel speeds) has been lowered to the predetermined threshold V2. In this case, the control flow goes to step 132 to reset the LOCK flag LKF to "0". The predetermined threshold V2 is a value below which the vehicle which has been running is considered to be brought into a stationary state. The threshold V2 is determined to be considerably close to zero, for example, 5 km/h.

After the LOCK flag LKF is reset to "0", an affirmative decision (YES) is obtained in step 224 in the automatic-parking-brake de-activation control routine of FIG. 4 described above, so that steps 226–230 are implemented, As a result, the inhibition of the automatic parking brake release by the MANUAL MODE control switch 22 placed in the third position Z is cancelled, so that the automatic parking brake applied to the rear wheels RW1, RW2 by the parking brake units 11, 12 can be released in the AUTO mode when the predetermined condition for initiating the automatic parking brake release is satisfied. This arrangement does not require the vehicle operator to perform any manipulation to cancel the inhibition of the automatic parking brake release, so that the ease of control of the parking brake system in the AUTO mode is accordingly increased.

There will next be described a second embodiment of the present invention, which is different from the first embodiment in that the AUTO MODE selector 21 and step 102 are not provided and the steps 122 and 128 are replaced by respective steps 322 and 328 (FIG. 6) in the second embodiment. The second embodiment is also different from the first embodiment in that the automatic-parking-brake activation control routine of FIG. 3 and the automatic-parking-brake de-activation control routine of FIG. 4 are replaced by an automatic-parking-brake activation control routine of FIG. 7 and an automatic-parking-brake de-activation control routine of FIG. 8. The control routine of FIG. 7 includes step 404 in place of the step 204 in the control routine of FIG. 3, and the control routine of FIG. 8 does not include a step corresponding to the step 224 in the control routine of FIG. 4. The second embodiment is also different from the first embodiment in that steps corresponding to the steps 108–114 of FIG. 2 are implemented independently of the control routine of FIG. 6, in the second embodiment. It is also noted that the second embodiment does not include steps corresponding to the steps 130 and 132 provided in the first embodiment. The same step numbers as used in the first embodiment are used in the second embodiment to identify the same steps as in the first embodiment, and redundant description of these steps will not be provided. The differences of the second embodiment with respect to the first embodiment will be discussed in detail.

Figure 5:
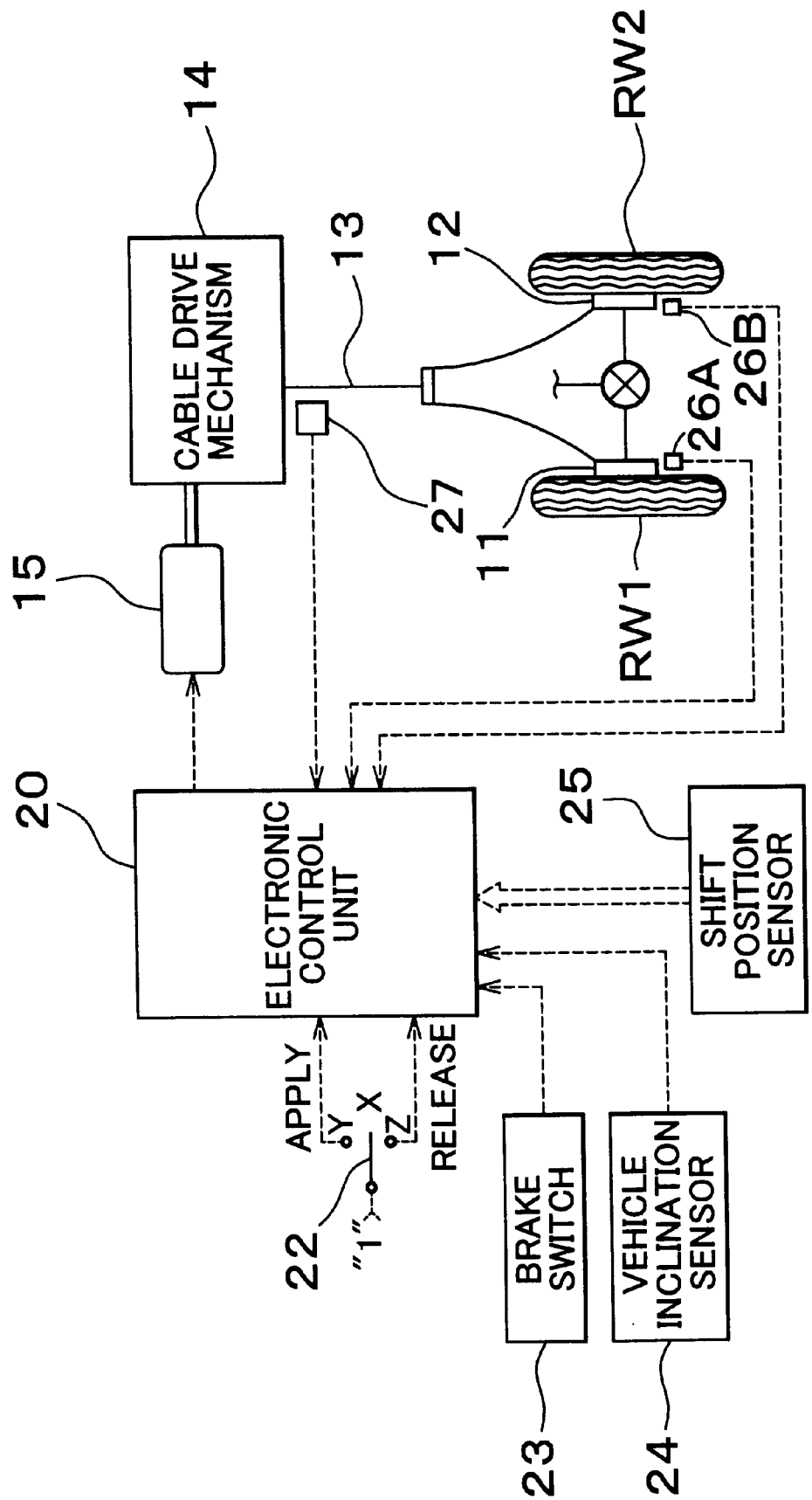
FIG. 5 is a schematic view showing a general arrangement of a parking brake system for an automotive vehicle, which system is constructed according to a second embodiment of this invention.
Figure 6:
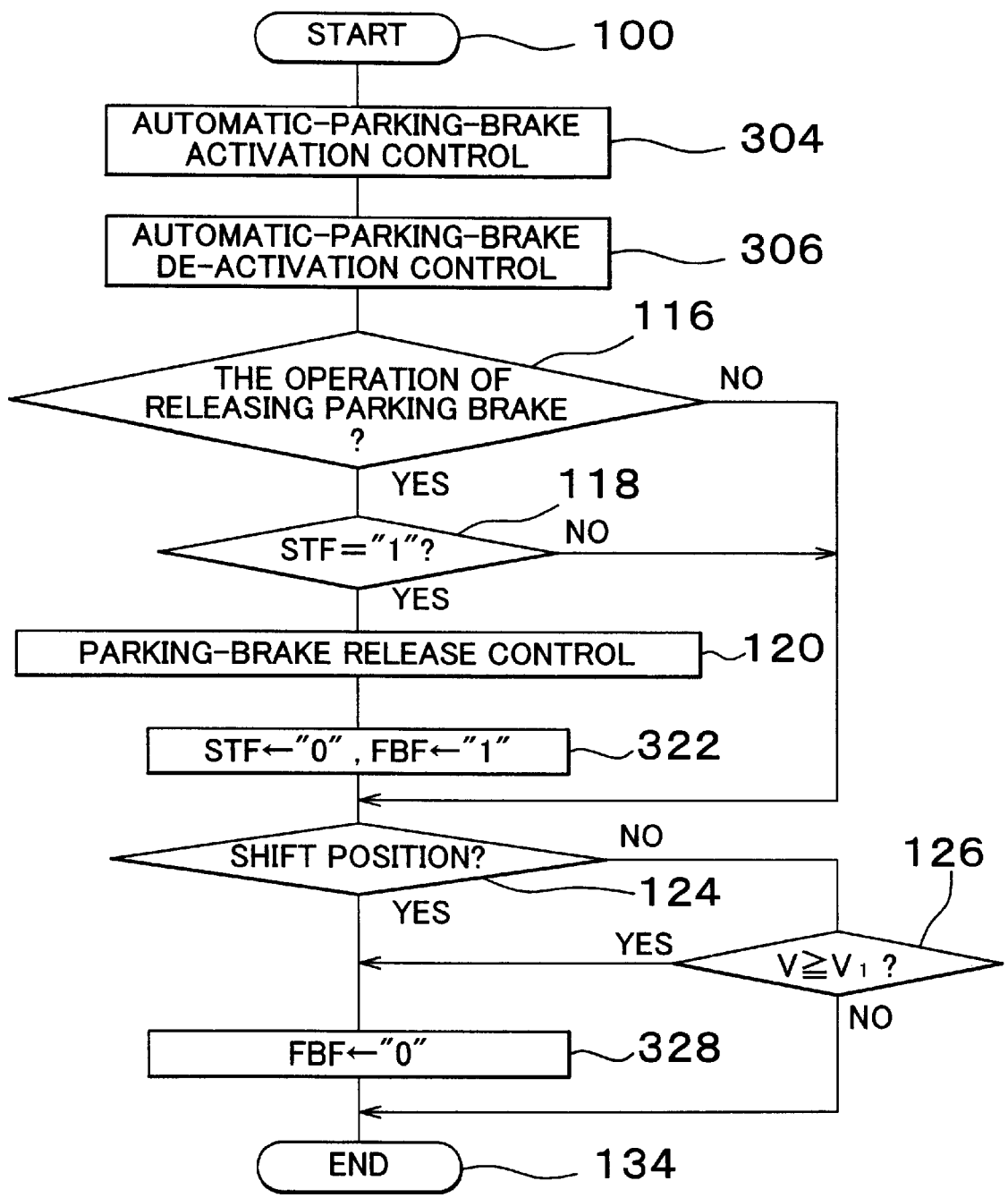
FIG. 6 is a flow chart illustrating a control program executed by an electronic control unit in the second embodiment.

Referring to the schematic view of FIG. 5, there is shown a general arrangement of a vehicle parking brake system constructed according to the second embodiment. As indicated above, the present parking brake system does not use the AUTO MODE selector 21. An operation of the present parking brake system will be described. After the ignition switch (not shown) is turned on, the program illustrated in the flow chart of FIG. 6 is repeatedly executed by the electronic control unit 20, to selectively apply and remove a parking brake to the rear wheels RW1, RW2. The program is initiated with step 100, which is followed by steps 304 and 306 to execute the automatic-parking-brake activation control routine of FIG. 7 and the automatic-parking-brake de-activation control routine of FIG. 8. These control routines will be discussed in detail.

Step 306 is followed by step 116 to determine whether the MANUAL MODE control switch 22 is operated to the third position Z for releasing the parking brake. If the negative decision (NO) is obtained in step 116, the control flow goes to step 124 and the subsequent steps, which will be described. If the MANUAL MODE control switch 22 is operated to the third position Z to release the parking brake, that is, if the affirmative decision (YES) is obtained in step 116, the control flow goes to step 118 to determine whether the STATE flag STF is set at "1". If the affirmative decision (YES) is obtained in step 118 with the STATE flag STF set at "1", the control flow goes to step 120 to effect the parking-brake release control as in the first embodiment. Step 322 is then implemented to reset the STATE flag STF to "0" and set a PARKING-BRAKE INHIBIT flag FBF to "1". The step 322 is followed by the step 124 and the subsequent steps. The function of the STATE flag STF is the same as explained in the first embodiment. The PARKING-BRAKE INHIBIT flag FBF set at "1" functions to provide stored data indicating that the application of the parking brake in the AUTO mode is inhibited. The flag FBF set at "0" functions to provide stored data indicating that the inhibition of the parking brake application has been cancelled.

Figure 7:
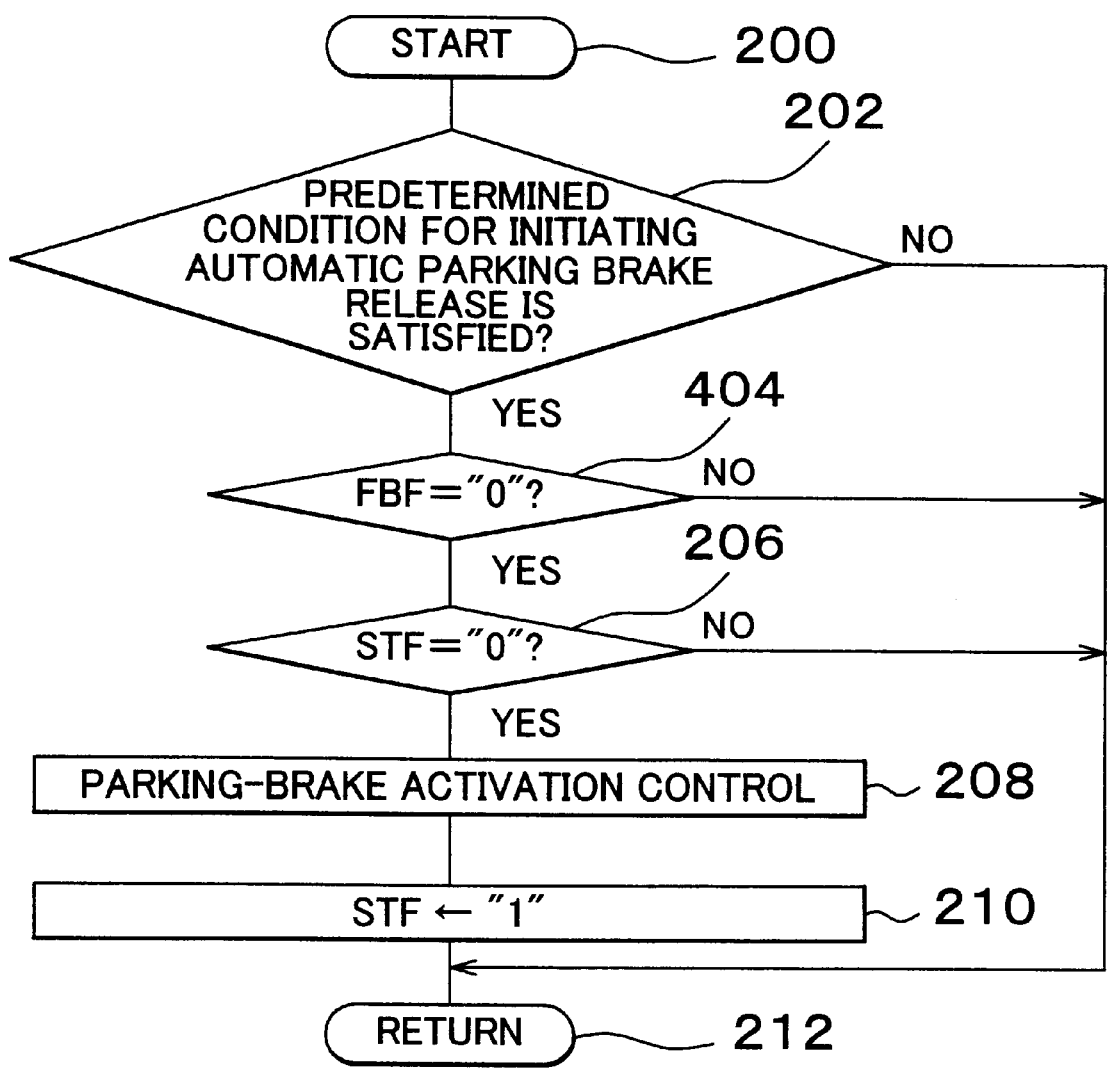
FIG. 7 is a flow chart showing details of an automatic-parking-brake activation control routine in the control program of FIG. 6.

In step 304 of FIG. 6, the automatic-parking-brake activation control routine is executed as illustrated in the flow chart of FIG. 7. This control routine is initiated with step 200, which is followed by step 202 to determine whether the predetermined condition for initiating the automatic parking brake application is satisfied. If the affirmative decision (YES) is obtained in step 202, the control flow goes to step 404 to determine whether the PARKING BRAKE INHIBIT flag FBF is set at "0". If this flag FBF is set at "1", that is, if the automatic parking brake application is inhibited, a negative decision (NO) is obtained in step 404, and the steps 206 through 210 are not implemented, so that the automatic parking brake application is inhibited, that is, the parking brake units 11, 12 will not be automatically activated to apply the parking brake to the rear wheels RW1, RW2. If the STATE flag STF is set at "0", steps 206–210 are implemented to effect the automatic parking brake application. Step 208 is followed by step 210 to set the STATE flag STF to "1".

Figure 8:
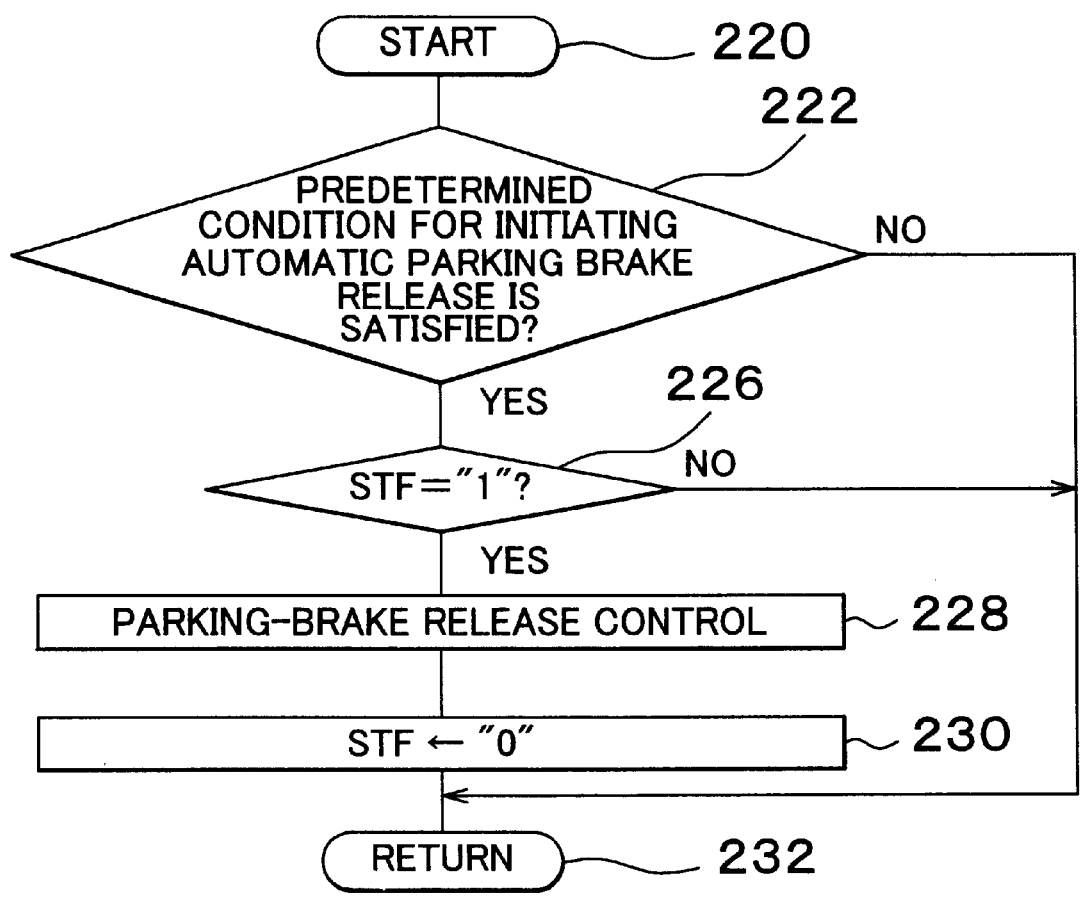
FIG. 8 is a flow chart showing details of an automatic-parking-brake de-activation control routine in the control program of FIG. 6.

In step 306 of FIG. 6, the automatic-parking-brake de-activation control routine is executed as illustrated in the flow chart of FIG. 8. The control routine of FIG. 8 does not include the step 224 provided in the control routine of FIG. 4 in the first embodiment. In the other exemplary aspects, the control routine of FIG. 8 is identical with that of FIG. 4, and no further description of the control routine of FIG. 8 is deemed necessary.

There will next be described an operation of the electronic control unit 20 to be performed when the MANUAL MODE control switch 22 is operated to the third position Z to release the parking brake, for starting the vehicle. In this case, the PARKING BRAKE INHIBIT flag FBF is set to "1" in step 322 since the control switch 22 has been operated to the third position Z. When the vehicle is started with the shift lever placed in any vehicle drive position, the affirmative decision (YES) is obtained in step 124, and the control flow goes to step 328 to reset the PARKING BRAKE INHIBIT flag to "0".

When the condition for inhibiting the automatic parking brake application is subsequently satisfied, the affirmative decision (YES) is obtained in step 202 in the automatic-parking-brake activation control routine of FIG. 7 (step 304 of FIG. 6), and the parking brake units 11, 12 are automatically activated to apply the parking brake to the rear wheels RW1, RW2.

Figure 9:
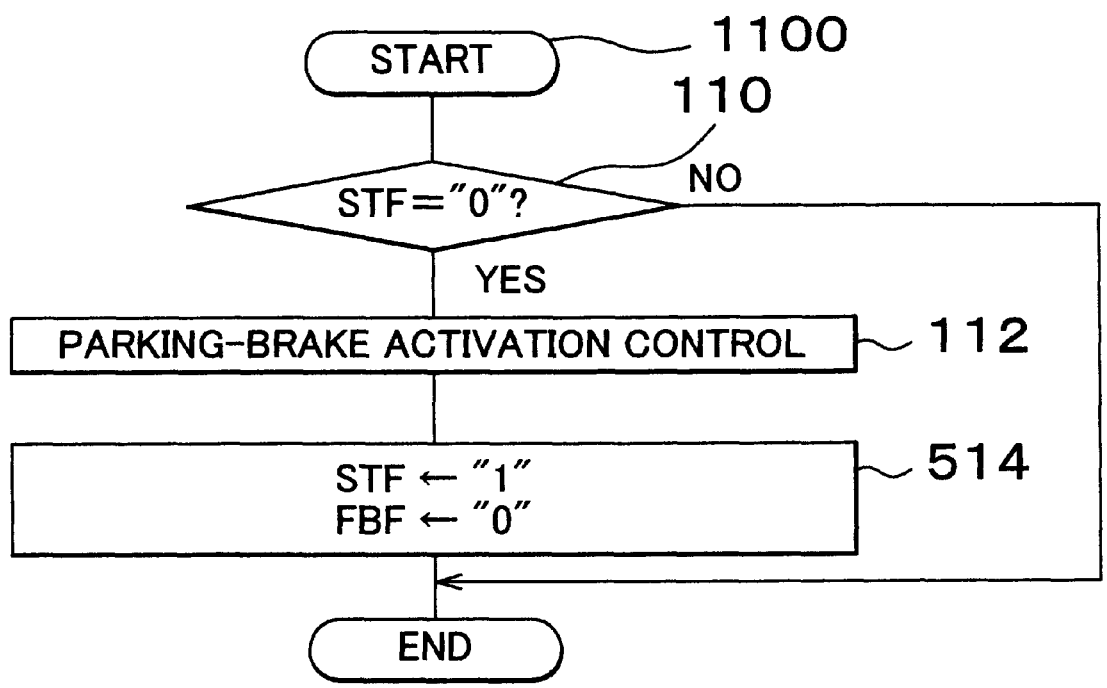
FIG. 9 is a flow chart illustrating a control program executed by the electronic control unit in the second embodiment when a manually operated selector member is operated to a third position.

Then, there will be described an operation of the control unit 20 to be performed when the MANUAL MODE control switch 22 is operated to the second position Y to effect the parking brake application. In this case, a control routine illustrated in the flow chart of FIG. 9 is executed independently of the control routine of FIG. 6. The control routine of FIG. 9 is initiated with step 1100, which is followed by step 110 to determine whether the STATE flag STF is set at "0". If this flag STF is set at "1", that is, the parking brake is applied to the rear wheels RW1, RW2, a negative decision (NO) is obtained in step 110, and one cycle of execution of the present control routine is terminated, without steps 112 and 514 being implemented. If an affirmative decision (YES) is obtained in step 110 with the flag STF set at "0", the control flow goes to step 112 to effect the parking brake application. Step 112 is followed by step 514 to set the STATE flag STF to "1" and reset the PARKING BRAKE INHIBIT flag FBF to "0". After the flag FBF is thus reset to "0", the automatic parking brake application is permitted in step 304 of FIG. 6, that is, in the automatic-parking-brake activation control routine of FIG. 7.

It will be understood that the parking brake system of the second embodiment is simplified in construction owing to the elimination of the AUTO MODE selector.

The second embodiment may be modified to eliminate the second position Y of the MANUAL MODE control switch 22 and the control routine of FIG. 9, so that the overall control of the parking brake system is simplified. In this case, another parking brake system other than that of the second embodiment may be provided so that the parking brake application may be effected by manipulation of an appropriate manually operable member.

Although the second embodiment is arranged to inhibit the parking brake application in step 208 by operating the MANUAL MODE control switch 22 to the third position Z, the second embodiment may be modified to inhibit the parking brake release in step 228 by operating the control switch 22 to the second position Y. Alternatively, the second embodiment may be modified to inhibit or interrupt the automatic parking brake application.

The MANUAL MODE control switch 22 used in the first and second embodiments may be replaced by a first manually operable member that applies the parking brake (that activates the parking brake units 11, 12), and a second manually operable member that releases the parking brake (that de-activates the parking brake units 11, 12). This modification permits the two manually operable members to be disposed at respective different positions, resulting in improved ease of control of the parking brake system by the vehicle operator. In this respect, it is noted that the second manually operable member may be operated to apply a parking brake to the vehicle in an emergency where a manually operable member that activates the service brake system cannot be operated by the vehicle operator for some physical defect of the operator. In view of this, the first manually operable member is desirably disposed at a position that is easily accessible by the vehicle operator when the operator desires to activate the parking brake system in place of the service brake system. The use of the two manually operable members indicated above permits the first manually operable member to be positioned within the operator's compartment of the vehicle, irrespective of the position of the first manually operable member, so that the first manually operable member is easily accessible in an emergency as indicated above.

The illustrated embodiments provide improved ease of control of the parking brake system in the AUTO mode, and permit inhibition of the automatic activation and de-activation of the parking brake units 11, 12 where the vehicle operator does not desire the automatic parking brake application or release. As described above, the vehicle operator's operation of the MANUAL MODE control switch 22 to its third position Z permits the removal of the parking brake from the rear wheels even in the AUTO mode selected by the AUTO MODE selector 21, before parking the vehicle for a long time during cold weather, making it possible to prevent freezing of the parking brake mechanism, which would take place if the parking brake were kept applied to the rear wheels for a long time under the cold weather.

It will be understood that the parking brake units 11, 12, electric motor 15, cable drive mechanism 14, parking brake cable 13 and cable tension sensor 27 cooperate with each other to constitute a parking-brake-force control mechanism. It will also be understood that the wheel speed sensors 26A, 26B, brake switch 23, vehicle inclination sensor 24 and shift position sensor 25 cooperate with each other to constitute a first vehicle-state detector, and a second vehicle-state detector. It will further be understood that a portion of the electronic control unit 20 assigned to implement the steps 104, 106, 304, 306 constitutes an automatic-parking-brake controller, while a portion of the control unit 20 assigned to implement the steps 112 and 120 constitutes manual-parking-brake controller. It will also be understood that a portion of the control unit 20 assigned to control the LOCK, RELEASE and PARKING BRAKE INHIBIT flags LKF, RLF, FBF constitutes a restricting means. It will further be understood that a portion of the control unit 20 assigned to implement the step 208 constitutes parking-brake applying means. It will also be understood that a portion of the control unit assigned to implement the steps 122 and 322 constitutes first memory means, while a portion of the control unit 20 assigned to implement the steps 128 and 328 constitutes first erasing means. It will further be understood that a portion of the control unit 20 assigned to implement the step 228 constitutes a parking-brake releasing means, and that a portion of the control unit 20 assigned to implement the step 114 constitutes a second memory means, while a portion of the control unit 20 assigned to implement the step 132 constitutes second erasing means.

The first vehicle-state detector may also serve as the second vehicle-state detector, or the second vehicle-state detector may also serve as the first vehicle-state detector.

The restricting of the invention includes inhibiting and interrupting.

In the illustrated embodiment, the controller (the electronic control unit 20) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A parking brake system for a vehicle, comprising:
    a parking-brake-force control mechanism driven by an electrically operated actuator and which is operable to selectively apply and remove a parking brake force to and from a wheel of the vehicle;
    an automatic-mode selector, manually operable by an operator of the vehicle, to select an automatic mode in which the parking brake force is automatically applied and removed to and from the wheel;
    a manual-mode control member, manually operable by the operator, to selectively apply and remove the parking brake force to and from the wheel;
    a first vehicle-state detector that detects a first operating state of the vehicle;
    a second vehicle-state detector that detects a predetermined second operating state of the vehicle; and
    a controller that controls the parking-brake-force control mechanism in the automatic mode according to the first operating state of the vehicle to control automatic application and removal of the parking brake force detected by the first vehicle-state detector, controls the parking-brake-force control mechanism in response to an operation of the manual-mode control member to control manual application and removal of the parking brake force even while the automatic application of the braking force is applied, and restricts the automatic control of the parking-brake-force control mechanism in the automatic mode until detection of the predetermined second operating state of the vehicle by the second vehicle-state detector.

2. The parking brake system according to claim 1, wherein the controller restricts application of the parking brake force to the wheel of the vehicle under the automatic control when the manual-mode control member is operated to remove the parking brake force from the wheel of the vehicle and cancels restriction of the application of the parking brake force to the wheel of the vehicle under the automatic control when the second vehicle-state detector has detected, as the predetermined second vehicle-operating state, at least one of an operation to start the vehicle and starting of the vehicle, the operation to start the vehicle including a completion of the operation to start the vehicle.

3. The parking brake system according to claim 1, wherein the controller applies the parking brake force to the wheel of the vehicle according to the automatic control when a parked state of the vehicle is detected by the first vehicle-state detector.

4. The parking brake system according to claim 1, wherein the controller restricts removal of the parking brake force from the wheel of the vehicle under the automatic control when the manual-mode control member is operated to apply the parking brake force to the wheel of the vehicle and cancels restriction of the removing of the parking brake force from the wheel of the vehicle under the automatic control, when the second vehicle-state detector has detected that the vehicle has become stationary.

5. The parking brake system according to claim 1, wherein the controller removes the parking brake force from the wheel of the vehicle according to the automatic control when a first vehicle-state detector has detected at least one of an operation to start the vehicle, and starting of the vehicle, the operation to start the vehicle including a completion of the operation to start the vehicle.

6. The parking brake system according to claim 1, the controller comprises:
    automatic-parking-brake means that controls the parking-brake-force control mechanism in the automatic mode;
    manual-parking-brake means that controls the parking-brake-force control mechanism in response to operations of the manual-mode control member; and
    restricting means that restricts an automatic control of the parking-brake-force control mechanism by the automatic-parking-brake controller, until a record of an operation of the manual-mode control member is erased upon detection of the predetermined second operating state of the vehicle.

7. A parking brake system according to claim 6, wherein the restricting means includes first memory means that records the operation of the manual-mode control member to remove the parking brake force from the wheel of the vehicle, and first erasing means that erases the operation to remove the parking brake force from the wheel of the vehicle recorded in the first memory means on a basis that the second vehicle-state detecting device has detected, as the predetermined second vehicle-operating state, at least one of an operation to start the vehicle, and the starting of the vehicle, the operation to start the vehicle including a completion of the operation to start the vehicle.

8. A parking brake system according to claim 6, wherein the automatic-parking-brake controller includes parking-brake applying means that applies the parking brake force to the wheel of the vehicle when a parked state of the vehicle is detected by the first vehicle-state detecting device.

9. A parking brake system according to claim 6, wherein the restricting means includes second memory means that records the operation of the manual-mode control member to apply the parking brake force to the wheel of the vehicle, and second erasing means that erases the operation to apply the parking brake force to the wheel of the vehicle recorded in the second memory means when the second vehicle-state detecting device has detected that the vehicle has become stationary.

10. A parking brake system according to claim 6, wherein the automatic-parking-brake controller includes parking-brake releasing means that removes the parking brake force from the wheel of the vehicle when the first vehicle-state detector has detected at least one of an operation to start the vehicle, and starting of the vehicle, the operation to start the vehicle including a completion of the operation to start the vehicle.

11. A parking brake system according to claim 6, wherein the restricting means includes first memory means that records the operation of the manual-mode control member to remove the parking brake force from the wheel of the vehicle, and first erasing means that erases the operation to remove the parking brake force from the wheel of the vehicle recorded in the first memory means on a basis of the operation of the manual-mode control member to apply the parking brake force to the wheel.

12. A parking brake system according to claim 6, wherein the restricting means may include second memory means that records the operation of the manual-mode control member to apply the parking brake force to the wheel of the vehicle, and second erasing means that erases the operation to apply the parking brake force to the wheel of the vehicle recorded in the second memory means on a basis that the manual-mode control member has been operated to remove the parking brake force from the wheel.

13. A method of controlling a parking brake system for a vehicle, the parking brake system comprising: (a) a parking-brake-force control mechanism driven by an electrically operated actuator and which is operable to selectively apply and remove a parking brake force to and from a wheel of the vehicle; (b) an automatic-mode selector, manually operable by an operator of the vehicle, to select an automatic mode in which the parking brake force is automatically applied and removed to and from the wheel; (c) a manual-mode control member, manually operable by the operator, to selectively apply and remove the parking brake force to and from the wheel; and (d) a controller that controls the parking-brake-force control mechanism according to a first operating state of the vehicle to control automatic application and removal of the parking brake force, and controls the parking-brake-force control mechanism, to control manual application and removal of the parking brake force even while the automatic application of the braking force is applied, the method comprising the steps of:

detecting operation of the manual-mode control member;

removing the operation of the manual-mode control upon detection of a predetermined second operating state of the vehicle; and restricting an automatic control of the parking-brake-force control mechanism while the manual-mode control member is operated.

14. A method of controlling a parking brake system for a vehicle, the parking brake system comprising: (a) a parking-brake-force control mechanism driven by an electrically operated actuator and which is operable to selectively apply and remove a parking brake force to and from a wheel of the vehicle; (b) an automatic-mode selector, manually operable by an operator of the vehicle, to select an automatic mode in which the parking brake force is automatically applied and removed to and from the wheel; (c) a manual-mode control member, manually operable by the operator, to selectively apply and remove the parking brake force to and from the wheel; and (d) a controller that controls the parking-brake-force control mechanism according to a first operating state of the vehicle to control automatic application and removal of the parking brake force, and controls the parking-brake-force control mechanism, to control manual application and removal of the parking brake force even while the automatic application of the braking force is applied, the method comprising the steps of:

recording an operation of the manual-mode control member;

erasing the record of the operation of the manual-mode control member upon detection of a predetermined second operating state of the vehicle; and restricting an automatic control of the parking-brake-force control mechanism by the controller as long as the operation of the manual-mode control member is recorded.

15. A method according to claim 14, wherein the operation of the manual-mode control member is an operation to remove the parking brake force from the wheel of the vehicle.

16. A method according to claim 15, wherein the step of erasing the record comprises erasing the record of the operation of the manual-mode control member to remove the parking brake force according to at least one of an operation to start the vehicle, and starting of the vehicle, the operation to start the vehicle including a completion of the operation to start the vehicle.

17. A method according to claim 14, wherein the automatic control of the parking-brake-force control mechanism is effected to apply the parking brake force to the wheel of the vehicle when the vehicle is under a parking state.

18. A method according to claim 14, wherein the operation of the manual-mode control member is an operation to apply the parking brake force to the wheel.

19. A method according to claim 18, wherein the record of the operation of the manual-mode control member to apply the parking brake force to the wheel is erased when the vehicle has become stationary.

20. A method according to claim 14, wherein the automatic control of the parking-brake-force control mechanism is effected to remove the parking brake force from the wheel according to at least one of an operation to start the vehicle, and starting of the vehicle, the operation to start the vehicle including a completion of the operation to start the vehicle.

21. A method according to claim 14, wherein the operation of the manual-mode control member is an operation to remove the parking brake force from the wheel, and wherein the record of the operation of the manual-mode control member to remove the parking brake force from the wheel is erased when the manual-mode control member is operated to apply the parking brake force to the wheel.

22. A method according to claim 14, wherein the operation of the manual-mode control member is an operation to apply the parking brake force to the wheel, and wherein the record of the operation of the manual-mode control member to apply the parking brake force to the wheel is erased when the manual-mode control member is operated to remove the parking brake force from the wheel is detected as the predetermined second operating state of the vehicle.

23. A parking brake system for a vehicle, comprising:

a parking-brake-force control mechanism driven by an electrically operated actuator and which is operable to selectively apply and remove a parking brake force to and from a wheel of the vehicle;

a manual-mode control member, manually operable by the operator, to effect at least one of application and removal of the parking brake force to and from the wheel; and a controller that controls the parking-brake-force control mechanism according to an operating state of the vehicle to control automatic application and removal of the parking brake force, to control the parking-brake-force control mechanism in response to an operation of the manual-mode control member to control the at least one of application and removal of the parking brake force to and from the wheel even while the automatic application of the braking force is applied, and the controller restricts an automatic control of the parking-brake-force control mechanism during the operation of the manual-mode control member.

24. A method of controlling a parking brake system for a vehicle, the parking brake system comprising: (a) a parking-brake-force control mechanism driven by an electrically operated actuator and which is operable to selectively apply and remove a parking brake force to and from a wheel of the vehicle; (b) a manual-mode control member, manually operable by the operator, to effect at least one of application and removal of the parking brake force to and from the wheel; and (c) a controller that controls the parking-brake-force control mechanism according to an operating state of the vehicle to control automatic application and removal of the parking brake force, and to control the parking-brake-force control mechanism in response to an operation of the manual-mode control member to control the at least one of application and removal of the parking brake force to and from the wheel even while the automatic application of the braking force is applied, the method comprising the steps of:

detecting an operation of the manual-mode control; and
restricting an automatic control of the parking-brake-force control mechanism by the controller during the operation of the manual-mode control member.

* * * * *